United States Patent
Wittig

(10) Patent No.: US 6,408,234 B1
(45) Date of Patent: Jun. 18, 2002

(54) AUTOMATIC COMPENSATION FOR ELECTRIC POWER STEERING HYSTERESIS

(75) Inventor: William Henry Wittig, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/657,200

(22) Filed: Sep. 7, 2000

Related U.S. Application Data
(60) Provisional application No. 60/183,596, filed on Dec. 18, 2000.

(51) Int. Cl.$^7$ ............................................... B62D 5/04
(52) U.S. Cl. .................................... 701/41; 180/443
(58) Field of Search ........................... 701/41, 42, 43; 180/421, 422, 423, 443, 446, 441; 318/432, 434

(56) References Cited

U.S. PATENT DOCUMENTS

| | | | |
|---|---|---|---|
| 4,393,694 A | 7/1983 | Marten et al. ................. 73/117 |
| 5,151,860 A | * 9/1992 | Taniguchi et al. ............. 701/41 |
| 5,404,960 A | * 4/1995 | Wada et al. ................... 701/41 |
| 5,422,810 A | 6/1995 | Brunning et al. ............. 180/446 |
| 5,446,660 A | 8/1995 | Miichi et al. ................. 180/443 |
| 5,668,722 A | 9/1997 | Kaufmann et al. ............ 701/41 |
| 5,698,956 A | * 12/1997 | Nishino et al. ............... 180/443 |
| 5,704,446 A | * 1/1998 | Chandy et al. .............. 180/446 |
| 5,719,766 A | * 2/1998 | Bolourchi ..................... 701/42 |
| 5,919,241 A | * 7/1999 | BoLourchi et al. ............ 701/41 |
| 6,039,144 A | * 3/2000 | Chandy et al. .............. 180/446 |
| 6,050,360 A | * 4/2000 | Pattok et al. ................. 180/446 |
| 6,184,637 B1 | * 2/2001 | Tanawaki et al. ............. 318/432 |

* cited by examiner

Primary Examiner—Gary Chin
(74) Attorney, Agent, or Firm—Edmund P. Anderson

(57) ABSTRACT

A method and apparatus for improving the return-to-center motion of a steering wheel (16) wherein a determination of a first and a second value; secondly, derive a set of two values from the first value; thirdly, compute a third value from the set of two values and the first value according to a predetermined formula; and fourth, calculate a steering command using the third value and the second value for enhancing the return-to-center motion.

10 Claims, 4 Drawing Sheets

AUTOMATIC COMPENSATION FOR ELECTRIC POWER STEERING HYSTERESIS

CROSS-REFERENCE TO RELATED APPLICATIONS

This application claims the benefit of U.S. provisional patent application Ser. No. 60/183,596 filed Feb. 18, 2000, the entire contents of which are incorporated herein by reference.

TECHNICAL FIELD

This invention relates to electric power steering, and more particularly, to automatic hysteresis compensation for electric power steering systems.

BACKGROUND OF THE INVENTION

Typical vehicle steering systems are constructed in such a way that the steering wheel will tend to return to center when let go by the operator of the vehicle. The center is defined as a straight line of travel. This return-to-center function is in response to road forces acting upon the turned front tires of the moving vehicle that tend to force the turned tires to the neutral (or center) position. However, friction in the steering system can interfere with the return-to-center function of the steering. One known method to prevent this is to reduce the overall steering ratio of the steering system, but this has the effect of increasing steering sensitivity, which is not always desirable.

In electric power steering systems, a known technique for preventing steering system friction from interfering with the return-to-center function is to generate a command, in relation to vehicle speed, that commands an electric power steering actuator to provide a return-to-center position force. The force exerted by the actuator overcomes the steering friction and allows the return-to-center function. In some systems, electric power steering motors are controlled either in a current mode or voltage mode. Current mode control provides certain advantages because the inherent control damping and speed dependability of voltage mode control are eliminated. However the elimination of the control damping that is present in the voltage mode can prevent the system from obtaining stable closed-loop poles. One solution provided is by creating an apparatus that includes a torque sensor coupled to a vehicle steering system for measuring steering wheel torque provided by a vehicle operator and, a steering angle sensor coupled to the steering system for measuring steering wheel angle. Furthermore, the apparatus may also include a controller, responsive to the measured steering wheel angle and vehicle speed, that provides a sum return-to-center command, as well as a motor responsive to the sum return-to-center command, a detailed description of which is described in Kaufmann et al., US 5,668,722, issued Sep. 16, 1997, for an Electric Power Steering Control. However, as the operating conditions such as temperature, wear, etc. change, a change in hysteresis, also known as friction or lash, occurs. This change in hysteresis adversely affects the performance of the steering system because the system is operating with a different hysteresis value from what the controller was designed to accommodate.

SUMMARY OF THE INVENTION

Disclosed herein are a method and an apparatus by which the hysteresis of a steering system is measured by the steering system controller and used to compute a value of friction compensation that is optimum for a current system state.

In an exemplary preferred embodiment of the invention, a controller continuously monitors the torque and position of the steering system handwheel and records a value of the torque signal each time the position sensor indicates a zero position. These torque values are then separated into two groups, one group denotes a set of torque values for clockwise handwheel movement, and another group denotes a set of torque values for counter-clockwise handwheel movement. A difference between these two groups of data, when suitably filtered for a predetermined period of time forms a measurement of the current system hysteresis. Thus, an enhancement that facilitates consistent performance of the electric power steering feel may be provided. The enhancement equalizes the differences that may exist among different individual electric power steering systems. These differences occur under circumstances such as temperature, wear and tear, and manufacturing variations in different electric power steering systems. From the foregoing it will be seen that this invention is based upon a measurement of a hysteresis of the electric power steering system during its operation. The measurement is possible because a set of sensors senses parameters such as torque or position of the electric power steering system. The relationship of torque and position parameters can be plotted and a symmetrical hysteresis loop curve may be drawn. It is noted that under practical operational circumstances, the loop curve may not be perfectly symmetrical. However, a symmetrical hysteresis curve may be used to best illustrate the concept of the instant invention.

DESCRIPTION OF THE PREFERRED EMBODIMENT

Figure 1:
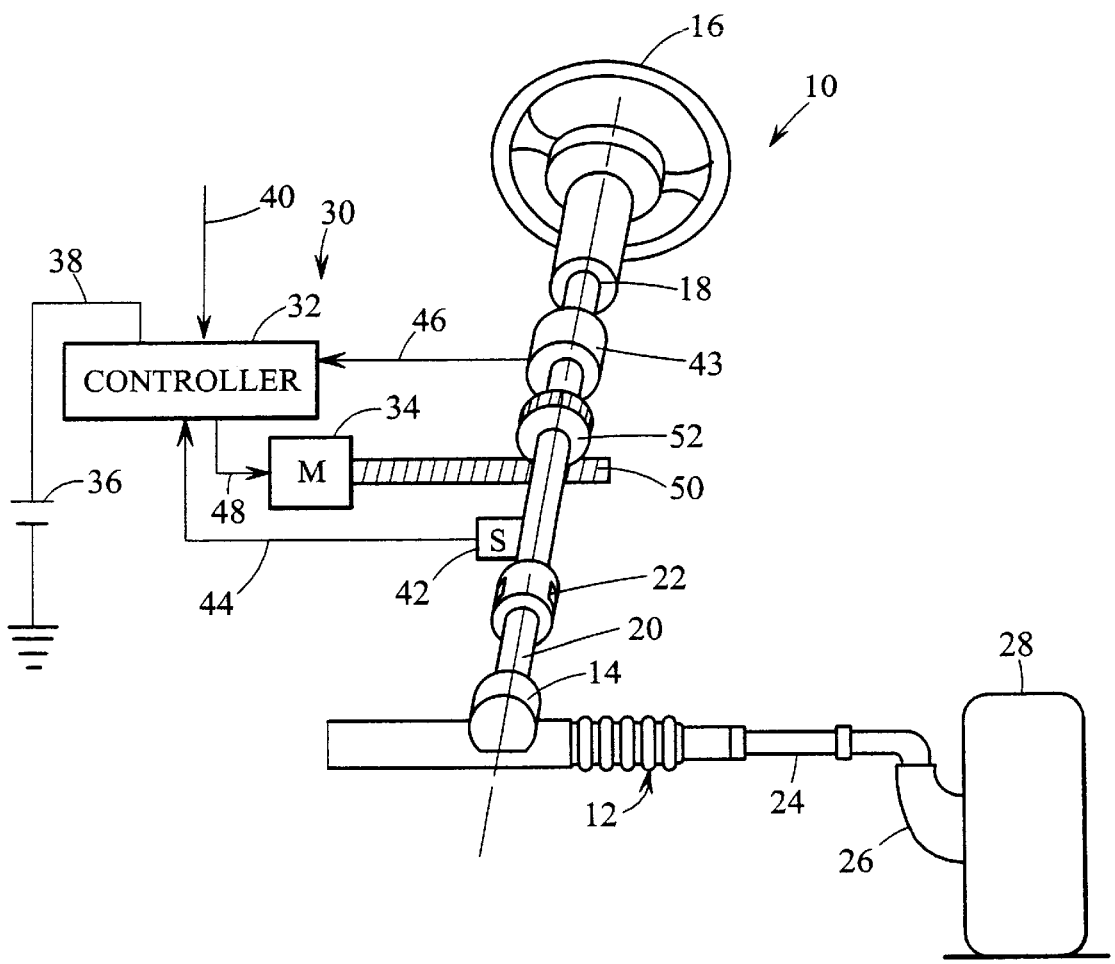
FIG. 1 is a schematic diagram showing an electric power steering control system according to this invention.

Referring to FIG. 1, reference numeral 10 generally designates a motor vehicle power steering system suitable for implementation of this invention. The steering mechanism 12 is a rack-and-pinion type system and includes a toothed rack (not shown) and a pinion gear (also not shown) located under gear housing 14. As the steering wheel 16 is turned, the upper steering shaft 18, connected to the lower steering shaft 20 through universal joint 22, turns the pinion gear. Rotation of the pinion gear moves the toothed rack that moves tie rods 24 (only one shown) that in turn move the steering knuckles 26 (only one shown), that turn wheels 28 (only one shown).

Electric power steering assist is provided through the unit generally designated by reference numeral 30 and includes a controller 32 and the electric motor 34. The controller 32 is powered by a vehicle power supply 36 through line 38. The controller 32 receives a signal representative of the vehicle velocity on line 40. Steering pinion gear angle is measured through position sensor 42 (which may be an optical encoding type sensor, variable resistance type sensor or any other suitable type of position sensor) and fed to the controller 32 through line 44.

As the steering wheel 16 is turned, a torque sensor 43 senses the torque applied to the steering wheel 16 by the vehicle operator. The torque sensor 43 may include a torsion bar (not shown) and a variable resistive-type sensor (also not shown) that outputs a variable resistance signal to controller 32 through line 46 in relation to the amount of twist on the torsion bar. Although this is the preferable torque sensor, any other suitable torque-sensing device used with known signal processing techniques will suffice.

In response to the inputs on lines 40, 44, and 46, the controller 32 sends a current command through line 48 to the electric motor 34. The motor 34 in turn supplies a torque assist to the steering system through a worm 50 and a worm gear 52, in such a way as to providing the torque assist to the vehicle steering in addition to a driving force exerted by the vehicle operator.

Figure 2:
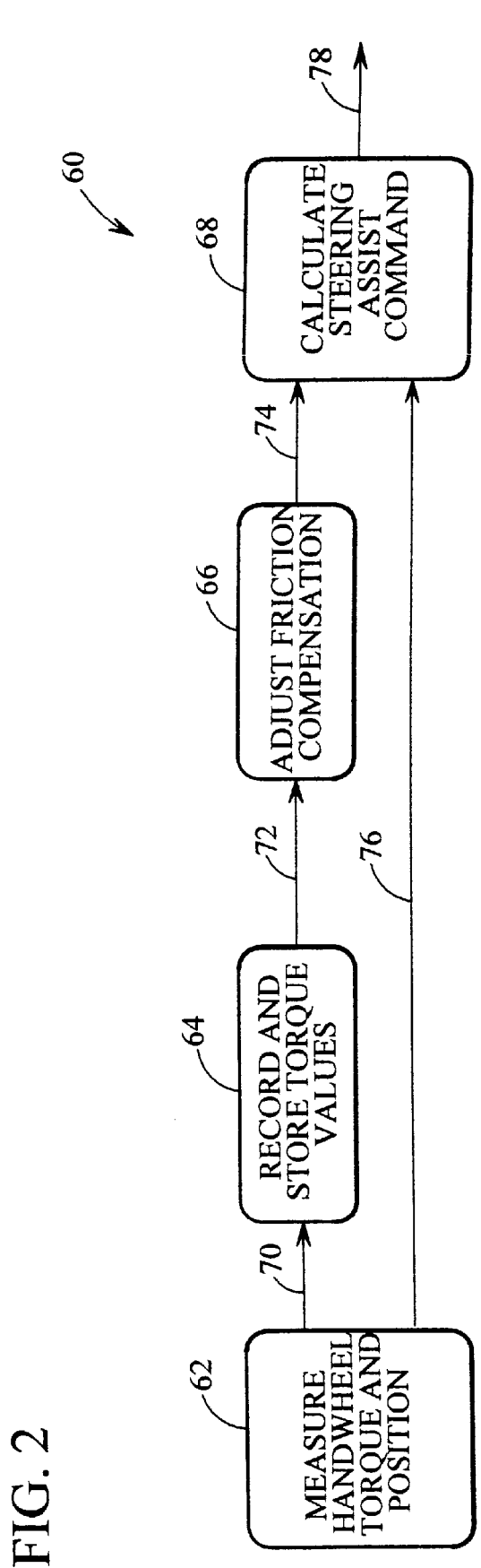
FIG. 2 illustrates the operation of a method for compensating for an electric power steering system hysteresis.

Referring to FIG. 2, reference numeral 60 generally designates a method for implementing the method for automatic compensation for electric power steering system within the controller 32. A measure of torque, for instance in Newton meters (Nm) is defined. In addition, a measure of position, for instance in degrees (deg) of moving away from the center line either clockwise or counter-clockwise is defined. Attention is drawn to the fact that the measure of torque and the measure of position is based on outputs of sensors. Torque data flows toward block 64 along line 70. In the block 64, the measured torque value is recorded and stored in a memory (not shown). It can be appreciated that the memory can be temporary registers in the controller 32 or other form of memories outside the controller 32 such as a random access memory, erasable programmed read only memory, or other suitable forms of memory. The recorded and stored torque values in block 64 then flow along line 72 toward block 66 wherein the recorded and stored torque values are weighted or adjusted according to a friction compensation table or schedule. It is evident that the friction compensation table or schedule is established through the utilization of sensors based, for instance, upon vehicle operating history, certain predetermined formulae, etc. It can be appreciated that a series of compensation settings are determined for a range of possible system hysteresis values. An optimum compensation setting can be determined using various known methods or formulae. After the above adjustment at block 66, the processed data flows along line 74 to block 68 wherein the incoming adjusted torque values are processed according to a predetermined formula. For example, a difference of the adjusted torque values and the measure of position that is processed in block 62 and transmitted along line 76 is computed and transmitted as output along line 78. It can be appreciated that data flowing through lines 70, 72, 74, and 76 can be processed according to known methods such that undesirable noise, flowing along data streams or lines 70, 72, 74, and 76, can be reduced. For example, defining a moving average as a basis for eliminating undesirable data may be used, etc.

Figure 3:
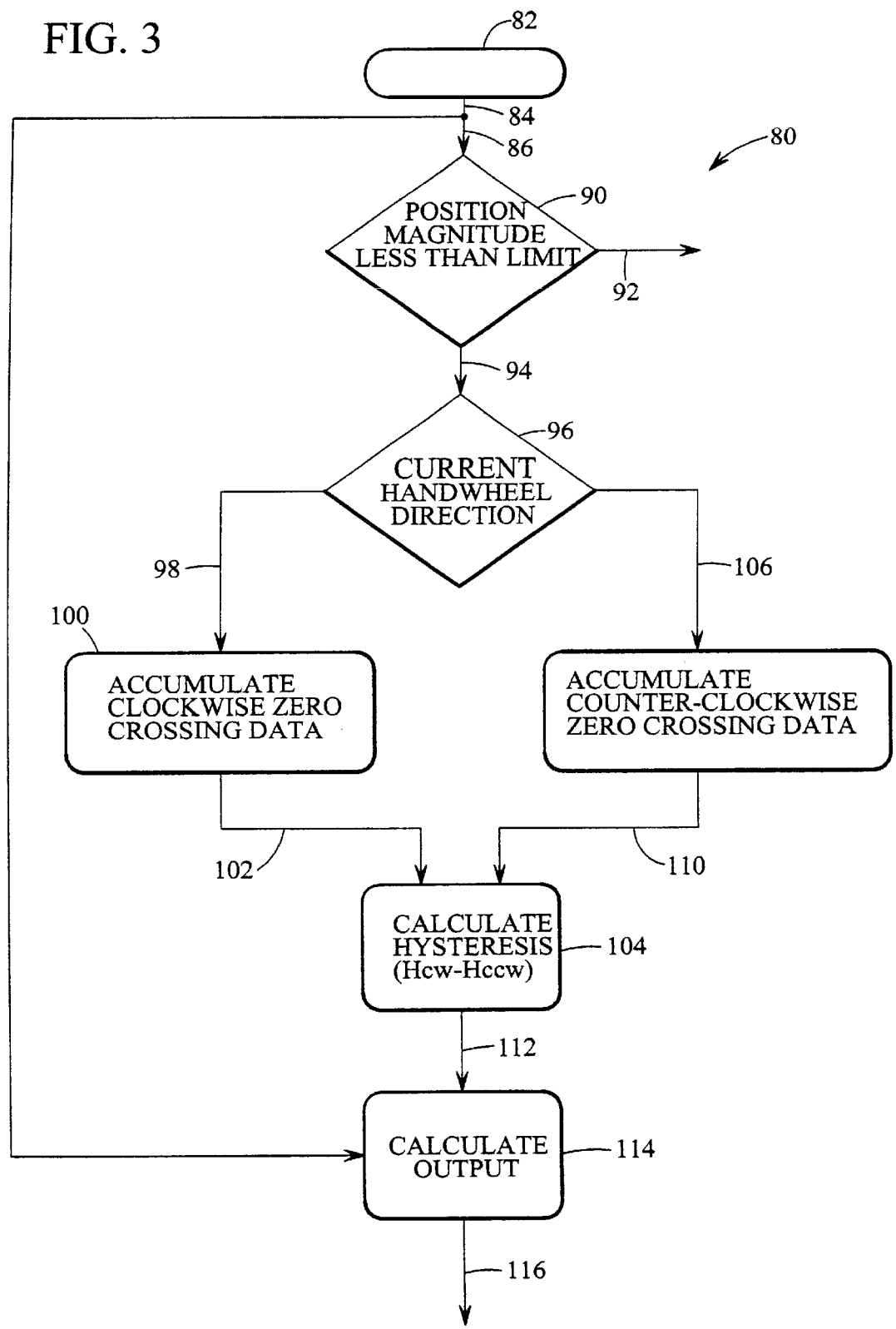
FIG. 3 illustrates the operation of the method in FIG. 2 wherein a detailed illustration is described.

Referring to FIG. 3, reference numeral 80 generally designates a detailed method for implementing the method for automatic compensation for electric power steering of FIG. 2. A flow chart is depicted. In block 82, a set of input value including input torque and position values is generated and flows through line 84. It is noted that the set of input values may be supplied by a set of sensors that sense and measure the set of requisite values. The input values from block 82 are branched into lines 86 and 88 containing essentially the same information. The input values are checked at diamond block 90 for position information. If the position value is greater than a predetermined limit, the information flows through line 92, and exits the instant flow-chart. If the steering wheel position is not within a programmable limit, the process stops, thus ensuring that the data used to determine a hysteresis estimate is within an appropriate region of a hysteresis loop curve. If the position value is less than a predetermined limit, the information flows through line 94, the information flows toward diamond block 96 for determination of a current steering wheel turning direction. The filtered data is separated into two groups depending upon current turning direction of the steering wheel. If the current steering wheel turning direction is clockwise, the information flows along line 98 toward block 100 wherein an accumulated clockwise zero crossing data is determined. The information then flows through line 102 toward block 104 for a calculation of hysteresis. Complementarily, if the current steering wheel turning direction is counter-clockwise, the information flows along line 106 toward block 108 wherein an accumulated counter-clockwise zero crossing data is determined. A known technique in filtering data may be used at this juncture. For example, a filtering technique using exponentially weighted moving average may be used. The information then flows through line 110 toward block 104 for a calculation of hysteresis. A hysteresis value is determined as a difference between a clockwise zero torque cross point and a counter-clockwise zero torque cross point. The calculated hysteresis information then flows along line 112 into block 114 wherein, together with the input values from block 82 that has branched into line 88, an output is calculated. The output may be used to adjust or create a compensation by increasing a return-to-center command or increasing an amount of assist to offset the hysteresis. The output then flows out along an output line 116.

Figure 4:
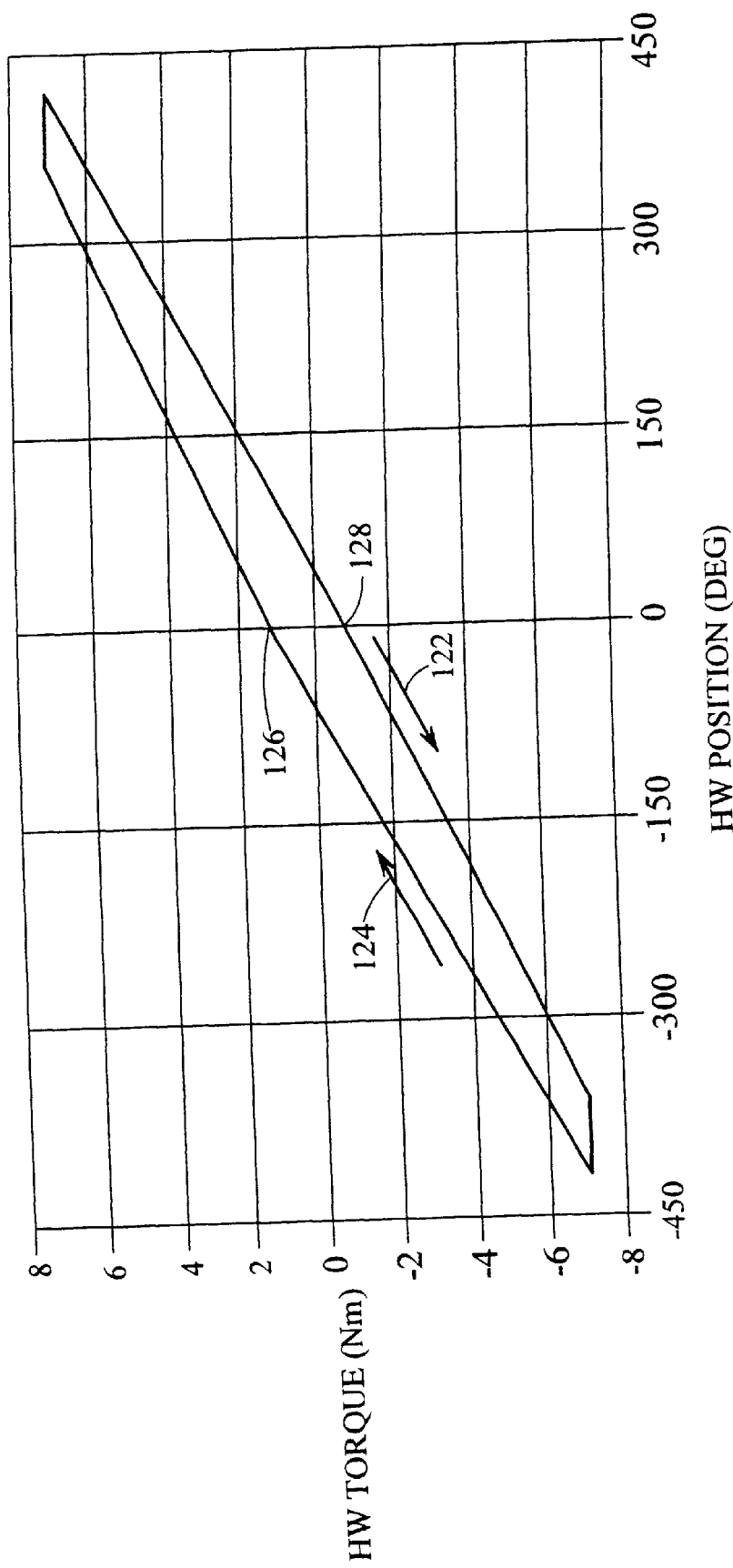
FIG. 4 illustrates an ideal hysteresis loop curve.

Referring to FIG. 4, reference numeral 120 generally designates an ideal hysteresis loop. The horizontal co-ordinate denotes steering wheel position measured in degrees as shown. The vertical co-ordinate denotes steering wheel torque measured in Newton Meters as shown. If no hysteresis exists, lines 122 and 124 collapse into a straight line (not shown). Because of the existence of wear and other factors, hysteresis occurs. Assuming that the wear and other factors are symmetrical, the instant loop curve may be drawn. When a clockwise turning occurs, the line 124 moves toward an upper right-hand direction wherein a zero cross point 126 is determined. Symmetrically, when a counter-clockwise turning occurs, the line 122 moves toward a lower left-hand direction wherein a zero cross point 128 is determined. A hysteresis is defined as the difference of the zero cross point 128 and the zero cross point 126.

It will be understood that a person skilled in the art may make modifications to the preferred embodiment shown herein within the scope and intent of the claims. While the present invention has been described as carried out in a specific embodiment thereof, it is not intended to be limited thereby but intended to cover the invention broadly within the scope and spirit of the claims.

What is claimed is:

1. A method for enhancing a return-to-center motion of a steering wheel, the method comprising:

determining a hysteresis value for a steering wheel torque as a function of the steering wheel torque and position values; and responsive to said hysteresis value, generating a steering command signal, said steering command signal thereby enhancing the return-to-center motion of the steering wheel;

wherein a magnitude of said steering command signal increases as said hysteresis value increases.

2. The method of claim 1, wherein said hysteresis value is further determined by:

storing a first group of input torque values and a first group of corresponding input position values when the steering wheel is turned in a first direction, said first group of corresponding input position values being determined with respect to a reference position; and storing a second group of input torque values and a second group of corresponding input position values when the steering wheel is turned in a second direction, said second group of corresponding input position values also being determined with respect to said reference position.

3. The method of claim 2, wherein said hysteresis value is further determined by:

determining, from said first group of input torque values, a first specific torque value at which the corresponding input position value thereto is equal to said reference position; and determining, from said second group of input torque values, a second specific torque value at which the corresponding input position value thereto is equal to said reference position;

wherein said hysteresis value is the difference between said first specific torque value and said second specific torque value.

4. The method of claim 3, wherein a given torque input is stored only if a magnitude of the corresponding input position value thereto is less than or equal to a predetermined limit.

5. The method of claim 2, wherein said first group of input torque values, said first group of corresponding input position values, said second group of input torque values, and said second group of corresponding input values are determined from outputs of sensors.

6. A steering system, comprising:

a steering wheel;

a steering shaft coupled to the steering wheel;

a set of sensors sensing a set of outputs from the steering shaft; and a controller controlling a motor for assisting a vehicle operator in operating the steering system, said controller further providing an enhanced return-to-center motion of the steering wheel, wherein said controller further comprises:

means for determining a hysteresis value for a steering wheel torque as a function of the steering wheel torque and position values; and responsive to said hysteresis value, means for generating a steering command signal, said steering command signal thereby enhancing the return-to-center motion of the steering wheel;

wherein a magnitude of said steering command signal increases as said hysteresis value increases.

7. The steering system of claim 6, wherein said hysteresis value is further determined by:

storing a first group of input torque values and a first group of corresponding input position values when the steering wheel is turned in a first direction, said first group of corresponding input position values being determined with respect to a reference position; and storing a second group of input torque values and a second group of corresponding input position values when the steering wheel is turned in a second direction, said second group of corresponding input position values also being determined with respect to said reference position.

8. The steering system of claim 7, wherein said hysteresis value is further determined by:

determining, from said first group of input torque values, a first specific torque value at which the corresponding input position value thereto is equal to said reference position; and determining, from said second group of input torque values, a second specific torque value at which the corresponding input position value thereto is equal to said reference position;

wherein said hysteresis value is the difference between said first specific torque value and said second specific torque value.

9. The steering system of claim 8, wherein a given torque input is stored only if a magnitude of the corresponding input position value thereto is less than or equal to a predetermined limit.

10. The steering system of claim 7, wherein said first group of input torque values, said first group of corresponding input position-values, said second group of input torque values, and said second group of corresponding input values are determined from said set of outputs from said set of sensors.

\* \* \* \* \*